UNITED STATES PATENT OFFICE.

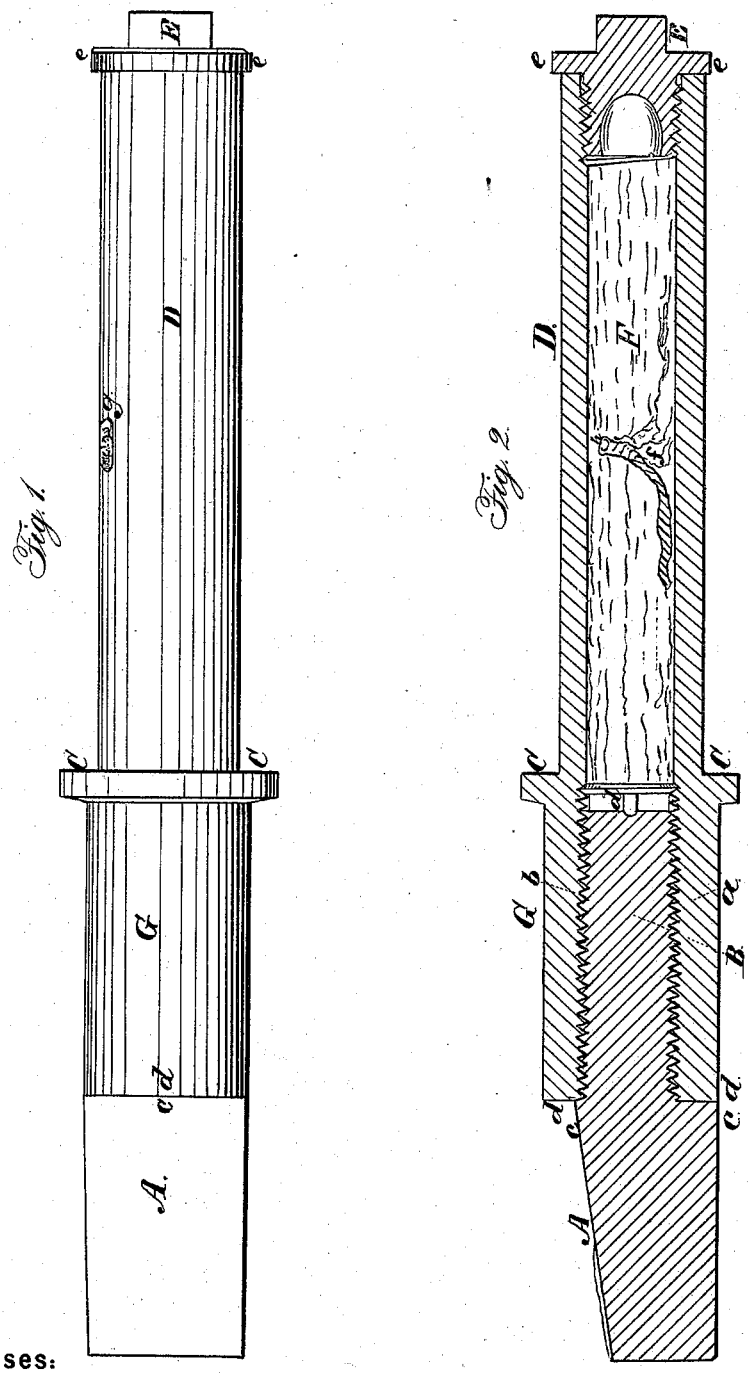

LATHROP DORMAN, OF WORCESTER, MASSACHUSETTS.

IMPROVEMENT IN AXLES AND JOURNALS FOR CARRIAGES.

Specification forming part of Letters Patent No. 57,100, dated August 14, 1866.

*To all whom it may concern:*

Be it known that I, LATHROP DORMAN, of the city and county of Worcester, and State of Massachusetts, have invented certain new and useful Improvements in Axles and Journals for Carriages; and I do hereby declare that the following is a full, clear, and exact description of the same, reference being had to the accompanying drawings, forming a part of this specification, in which—

Figure 1 represents a top or plan view of a journal and so much of an axle of a carriage as is necessary to illustrate my invention, and Fig. 2 represents a longitudinal central section of Fig. 1.

To enable those skilled in the art to which my improvements belong to make and use the same, I will proceed to describe the invention.

In the drawings, A represents a portion of one end of an iron axle made according to my invention. It has a projecting end, B, which is provided with a screw, $a$, which takes into the female screw-thread $b$ upon the inside of the wrist G. From the latter projects the hollow journal D, upon which the wheel of the carriage turns. The wheel is retained in proper position upon the journal D by a shoulder, C, and a flange, $e$, upon nut E, which latter screws into the end of journal D, all as indicated in the drawings.

Projection B and nut E are fitted so as to prevent oil or other lubricating material from running out of chamber F, into which it is to be turned, and from which it is to be gradually conveyed to the inside of the box of the wheel by means of the wick $f$, which passes through hole $h$ in the journal D, as seen at $g$, thereby keeping the journal well lubricated at all times.

A recess, $d$, is cut in the end of the projection B, so that in case of the accidental breaking off of projection B in the wrist G the part B can be removed by removing nut E and inserting a screw-driver through chamber F. The threads on nut E and the projection B are cut so that the action of the wheel as it revolves will tend to keep both firm in position.

The axle A, a part of which is shown in the drawings, is provided at the other end with a projection, B, and journal D, and the parts connected therewith.

The parts marked D and G may be made of malleable iron, or they may be made of wrought metal by any of the well-known modes of rolling and welding.

The shoulders $c$ and $d$ of the parts marked A and G fit closely together, as seen in the drawings.

Having described my invention, what I claim therein as new, and desire to secure by Letters Patent, is—

1. The combination, with the axle A and projection B, of the wrist G, hollow journal D, nut E, and shoulder C, substantially as set forth.

2. The combination, with journal D, of nut E and projection B, substantially as set forth.

3. Making the journal D hollow its entire length and providing it with a wick, $f$, which passes through hole $h$, whereby the outer surface of journal D is always kept lubricated, and the end B, if accidentally broken off, can be removed, substantially as set forth.

LATHROP DORMAN.

Witnesses:
  THOS. H. DODGE,
  H. L. FULLER.